United States Patent
Ueno et al.

(10) Patent No.: US 11,204,447 B2
(45) Date of Patent: Dec. 21, 2021

(54) SURFACE-PROTECTIVE FILM-ATTACHED POLARIZING FILM, AND METHOD FOR PRODUCING POLARIZING FILM

(71) Applicant: NITTO DENKO CORPORATION, Ibaraki (JP)

(72) Inventors: Tomonori Ueno, Ibaraki (JP); Satoshi Mita, Ibaraki (JP); Atsushi Kishi, Ibaraki (JP); Kentaro Ikeshima, Ibaraki (JP); Yusuke Motegi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 17 days.

(21) Appl. No.: 16/086,751

(22) PCT Filed: Mar. 16, 2017

(86) PCT No.: PCT/JP2017/010680
§ 371 (c)(1),
(2) Date: Sep. 20, 2018

(87) PCT Pub. No.: WO2017/164065
PCT Pub. Date: Sep. 28, 2017

(65) Prior Publication Data
US 2019/0129072 A1    May 2, 2019

(30) Foreign Application Priority Data
Mar. 22, 2016 (JP) .............................. JP2016-057165

(51) Int. Cl.
*G02B 1/14* (2015.01)
*B32B 27/30* (2006.01)
(Continued)

(52) U.S. Cl.
CPC .................. *G02B 1/14* (2015.01); *B32B 7/12* (2013.01); *B32B 27/08* (2013.01); *B32B 27/30* (2013.01);
(Continued)

(58) Field of Classification Search
CPC ...... G02B 1/14; G02B 5/3033; G02B 5/3025; G02B 5/30; B32B 27/30; B32B 27/306;
(Continued)

(56) References Cited

U.S. PATENT DOCUMENTS

2006/0108050 A1* 5/2006 Satake .................... B32B 7/06
156/101
2012/0055607 A1  3/2012 Kitagawa et al.
(Continued)

FOREIGN PATENT DOCUMENTS

CN        103189785 A     7/2013
CN        103675979 A     3/2014
(Continued)

OTHER PUBLICATIONS

Notification of Transmittal of Translation of the International Preliminary Report on Patentability (Form PCT/IB/338) issued in counterpart International Application No. PCT/JP2017/010680 dated Oct. 4, 2018, with Forms PCT/IB/373 and PCT/ISA/237. (7 pages).
(Continued)

*Primary Examiner* — Mustak Choudhury
(74) *Attorney, Agent, or Firm* — Westerman, Hattori, Daniels & Adrian, LLP

(57) ABSTRACT

A surface-protective film attached polarizing film is disclosed which includes a polarizing film (A) having a thickness of 100 μm or less, and a surface-protective film (B) provided on at least one surface of the polarizing film (A), wherein the polarizing film (A) comprises a polarizer, and a protective film provided on at least one surface of the
(Continued)

widthwise direction polarizer, the polarizer comprises a polyvinyl alcohol-based resin and has a thickness of 10 μm or less, the polarizing film (A) has a width $W_A$, the surface-protective film (B) has a width $W_B$, a difference between the widths $W_A$ and $W_B$ ($W_A-W_B$) is 3 mm or more, and a peel strength of the surface-protective film (B) to the polarizing film (A) is 0.2 N/25-mm or less. The surface-protective film-attached polarizing film allows to be restrained the polarizing film from being broken, when the surface-protective film is peeled from the polarizing film.

5 Claims, 1 Drawing Sheet

(51) Int. Cl.
  *G02B 5/30* (2006.01)
  *B32B 7/12* (2006.01)
  *B32B 27/08* (2006.01)

(52) U.S. Cl.
  CPC .......... *B32B 27/306* (2013.01); *G02B 5/3025* (2013.01); *G02B 5/3033* (2013.01); *B32B 2307/42* (2013.01); *B32B 2307/584* (2013.01); *B32B 2457/202* (2013.01); *B32B 2457/206* (2013.01)

(58) Field of Classification Search
  CPC ..... B32B 27/08; B32B 7/12; B32B 2457/206; B32B 2457/202; B32B 2307/584; B32B 2307/42; B32B 2307/748; B32B 2307/732; B32B 2307/514; B32B 2457/20; B32B 27/32
  See application file for complete search history.

(56) References Cited

U.S. PATENT DOCUMENTS

| | | | |
|---|---|---|---|
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057231 A1 | 3/2012 | Goto et al. | |
| 2012/0058291 A1 | 3/2012 | Kitagawa et al. | |
| 2012/0058321 A1 | 3/2012 | Goto et al. | |
| 2012/0300299 A1 | 11/2012 | Yasui et al. | |
| 2013/0189449 A1 | 7/2013 | Fukagawa et al. | |
| 2014/0063603 A1 | 3/2014 | Goto et al. | |
| 2015/0029447 A1 | 1/2015 | Hirata et al. | |
| 2015/0299520 A1* | 10/2015 | Mansei | C08G 18/755 428/78 |
| 2016/0124131 A1* | 5/2016 | Kobayashi | G02B 5/3016 428/141 |
| 2016/0161652 A1 | 6/2016 | Kitagawa et al. | |

FOREIGN PATENT DOCUMENTS

| | | | | |
|---|---|---|---|---|
| JP | 2000-214324 A | 8/2000 | | |
| JP | 2002-303730 A | 10/2002 | | |
| JP | 2004-170907 A | 6/2004 | | |
| JP | 2010-1360 A | 1/2010 | | |
| JP | 2011-113026 A | 6/2011 | | |
| JP | 4751481 B1 | 8/2011 | | |
| JP | 2012-126127 A | 7/2012 | | |
| JP | 2012-247574 A | 12/2012 | | |
| JP | 2013-029754 A | 2/2013 | | |
| JP | 2013029754 A * | 2/2013 | | |
| JP | 2013-174861 A | 9/2013 | | |
| JP | 2013-218317 A | 10/2013 | | |
| JP | 2013218317 A * | 10/2013 | ............. B29C 55/16 |
| JP | 2015-25125 A | 2/2015 | | |
| WO | 2011/065584 A1 | 6/2011 | | |
| WO | 2014/061611 A1 | 4/2014 | | |

OTHER PUBLICATIONS

International Search Report dated May 9, 2017, issued in counterpart International Application No. PCT/JP2017/010680 (2 pages).
Office Action dated Oct. 28, 2019, issued in JP Patent Application No. 2016-057165, with English translation.
Office Action dated Dec. 18, 2019, issued in JP Patent Application No. 2016-057165, with English translation.
Office Action dated Jun. 11, 2019, issued in counterpart JP Application No. 2016-057165, with English translation. (10 pages).
Office Action dated Mar. 27, 2020, issued in counterpart CN application No. 201780016886.0, with English translation. (13 pages).
Office Action dated Apr. 28, 2020, issued in counterpart KR application No. 10-2018-7029390, with English translation (9 pages).
Office Action dated May 11, 2020, issued in counterpart JP application No. 2016-057165, with English translation. (12 pages).
Office Action dated Jun. 24, 2020, issued in counterpart TW Application No. 106109278, with English Translation. (13 pages).
Office Action dated Nov. 13, 2020, issued in counterpart CN Application No. 201780016886.0, with English Translation. (13 pages).
Office Action dated Jan. 11, 2021, issued in counterpart KR Application No. 10-2018-7029390, with English Translation. (10 pages).
The Decision of Rejection dated May 3, 2021, issued in counterpart KR Application No. 10-2018-7029390, with English Translation. (7 pages).
Office Action dated Jan. 21, 2021, issued in counterpart TW Application No. 106109278, with English Translation. (7 pages).

\* cited by examiner

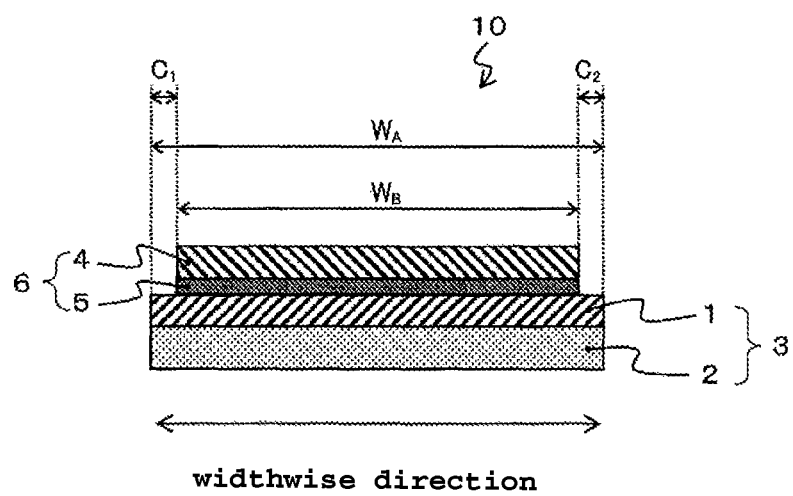

SURFACE-PROTECTIVE FILM-ATTACHED POLARIZING FILM, AND METHOD FOR PRODUCING POLARIZING FILM

TECHNICAL FIELD

The present invention relates to a surface-protective film-attached polarizing film. The invention also relates to a method for producing a polarizing film, including the step of peeling off, from the surface-protective film-attached polarizing film, the surface-protective film. The polarizing film yielded by peeling off, from the surface-protective film-attached polarizing film of the invention, the surface-protective film is usable singly or in an optical laminate on which this polarizing film is laminated to form an image display such as a liquid crystal display (LCD) or an organic EL display.

BACKGROUND ART

The liquid crystal display market has experienced rapid growth in many applications such as clocks, cellular phones, personal digital assistants, notebook PCs, PC monitors, DVD players, and TVs. Liquid crystal display devices use liquid crystal switching to visualize the polarization state, and on the basis of the display principle, they use polarizers.

For example, iodine-based polarizers composed of stretched polyvinyl alcohol film and iodine adsorbed thereto are most popular polarizers widely used because of their high transmittance and high degree of polarization. Such polarizers have disadvantages such as extremely weak mechanical strength and heat or water shrinkability, which can cause a significant reduction in polarizing function. Therefore, immediately after produced, a polarizer is bonded to an adhesive-coated protective film with the adhesive interposed therebetween, and the resulting polarizing film is used for applications.

On the other hand, as image display devices such as liquid crystal display devices have been reduced in thickness, polarizing films have also been required to be thin. Thus, polarizers are also made thinner (see, for example, Patent Document 1). Moreover, polarizing films can also be made thinner by using a single-side-protected polarizing film yielded by laying a protective film onto only one side of the two sides of polarizer without laying any protective film onto the other side of polarizer. Such a single-side-protected polarizing film can be made thinner since when this polarizing film is compared with a double-side-protected polarizing film, in which protective films are laid, respectively, onto both surfaces of a polarizer, the protective film of the single-side-protected polarizing film is smaller in number than the protective films of the double-side-protected polarizing film by one.

In many cases, in the step of producing, for example, an image display, about the polarizing film, a surface-protective film is bonded thereto in order to protect an outer surface of the polarizing film. As such a surface-protective film, various films are known (see, for example, Patent Document 2).

PRIOR ART DOCUMENTS

Patent Documents

Patent Document 1: JP-B1-4751481
Patent Document 2: JP-A-2010-1360

SUMMARY OF THE INVENTION

Problems to be Solved by the Invention

As described in Patent Document 2, in many cases, a polarizing film is handled in the state that a surface-protective film is bonded thereto to protect an outer surface of the polarizing film. However, in a practical use of the polarizing film, at the time of peeling off the surface-protective film from the polarizing film (which is particularly a single-side-protected polarizing film), the polarizing film may be broken. Such a problem of the breaking of a polarizing film is remarkably caused in thin polarizing films described in Patent Document 1 and others.

Accordingly, an object of the present invention is to provide a surface-protective film-attached polarizing film which can be restrained the polarizing film from being broken when the surface-protective film is peeled off therefrom. Another object of the present invention is to provide a method for producing a polarizing film, including the step of peeling off, from the above-mentioned surface-protective film-attached polarizing film, the surface-protective film.

Means for Solving the Problems

As a result of intensive studies, the inventors have accomplished the invention based on findings that the problems can be solved by the method for producing a surface-protective film-attached polarizing film described below.

That is, the present invention relates to a surface-protective film-attached polarizing film, comprising a polarizing film (A) having a thickness of 100 μm or less, and a surface-protective film (B) on at least one surface of the polarizing film (A),
wherein
the polarizing film (A) comprises a polarizer, and a protective film on at least one surface of the polarizer,
the polarizer comprises a polyvinyl alcohol-based resin and has a thickness of 10 μm or less,
the polarizing film (A) has a width $W_A$, the surface-protective film (B) has a width $W_B$, a difference between the widths $W_A$ and $W_B$ ($W_A-W_B$) is 3 mm or more, and
a peel strength of the surface-protective film (B) to the polarizing film (A) is 0.2 N/25-mm or less.

In the surface-protective film-attached polarizing film of the invention, the polarizing film (A) is preferably a single-side-protected polarizing film comprising a polarizer and a protective film on only one surface of the polarizer, and the surface-protective film (B) is preferably provided at least on a polarizer surface of the single-side-protected polarizing film.

In the surface-protective film-attached polarizing film of the invention, the width $W_B$ of the surface-protective film (B) is preferably from 1100 mm to 2000 mm.

The present invention also relates to a method for producing a polarizing film, comprising:
a step (1) of bonding a surface-protective film (B) to at least one surface of a polarizing film (A) having a thickness of 100 μm or less to produce the surface-protective film-attached polarizing film, and
a step (2) of peeling off the surface-protective film (B) from the surface-protective film-attached polarizing film.

The method for producing a polarizing film of the invention preferably comprises, before the step (1), a step (3) of subjecting both ends of the polarizing film (A), the thickness of which is 100 μm or less, to slit working.

Effects of the Invention

The surface-protective film (B), which is used of the surface-protective film-attached polarizing film of the present invention, is smaller in width than the polarizing film (A), and further has a specified peel strength to the polarizing film (A). Therefore, when the surface-protective film (B) is peeled from the polarizing film (A), the polarizing film (A) can be restrained from being broken. Accordingly, the method of the present invention for producing a polarizing film allows to supply the polarizing film to have only a remarkably small quantity of defects such as breaking. This polarizing film is favorably usable for image displays and others.

BRIEF DESCRIPTION OF THE DRAWINGS

FIG. 1 is a schematic cross-sectional view of an example of the surface-protective film-attached polarizing film of the invention.

MODE FOR CARRYING OUT THE INVENTION

1. Surface-Protective Film-Attached Polarizing Film

The surface-protective film-attached polarizing film of the present invention includes a polarizing film (A) having a thickness of 100 μm or less, and a surface-protective film (B) provided on at least one surface of the polarizing film (A), wherein the polarizing film (A) includes a polarizer, and a protective film on at least one surface of the polarizer, the polarizer includes a polyvinyl alcohol-based resin and has a thickness of 10 μm or less, the polarizing film (A) has a width $W_A$, the surface-protective film (B) has a width $W_B$, a difference between the widths $W_A$ and $W_B$ ($W_A - W_B$) is 3 mm or more, and a peel strength of the surface-protective film (B) to the polarizing film (A) is 0.2 N/25-mm or less.

The surface-protective film-attached polarizing film of the present invention will be described with reference to FIG. 1. However, the invention is not limited to these FIGURES.

A surface-protective film-attached polarizing film 10 of the present invention includes a polarizing film (A) 3 and a surface-protective film (B) 6 on at least one surface of the polarizing film (A) 3.

The polarizing film (A) 3 used in the present invention includes polarizer 1 and a protective film 2 on at least one surface of the polarizer 1. The polarizer 1 and the protective film 2 can be laminated over each other to interpose, therebetween, an intervening layer such as an adhesive layer, a pressure-sensitive adhesive layer, or an undercoat layer (primer layer) (not illustrated). FIG. 1 has illustrated a single-side-protected polarizing film, which has the polarizer 1 and the protective film 2 on only one surface of the polarizer 1. However, polarizing film (A) used in the invention may be a double-side-protected polarizing film having the polarizer 1 and the polarizing films 2, respectively, on both surfaces of the polarizer 1.

When the polarizing film (A) 3 is a single-side-protected polarizing film, the surface-protective film (B) 6 is bonded, as illustrated in FIG. 1, onto at least the polarizer 1 of the single-side-protected polarizing film. When the polarizing film (A) 3 is a double-side-protected polarizing film, the surface-protective film (B) 6 is bonded onto at least one of the protective films 2. The surface-protective film (B) 6 usually has a substrate film 4 and a pressure-sensitive adhesive layer 5 to protect the polarizing film (A) 3 by aid of the pressure-sensitive adhesive layer 5.

In the present invention, as illustrated in FIG. 1, the width $W_A$ of the polarizing film (A) 3 is larger than the width $W_B$ of the surface-protective film (B) 6. The difference ($W_A - W_B$) therebetween is 3 m or more. Specifically, an embodiment thereof is an embodiment as illustrated in FIG. 1, in which one of the two ends in the widthwise direction of the surface protective film (B) 6 is present inward, by a distance $C_1$, from the corresponding one of the two ends of the polarizing film (A) 3, and the other end in the widthwise direction of the surface protective film (B) 6 is present inward, by a distance $C_2$, from the corresponding other end of the polarizing film (A) 3. The total of $C_1$ and $C_2$ is sufficient to be 3 mm or more. $C_1$ and $C_2$ are each preferably more than 1 mm. It is preferred to bond the surface-protective film (B) to the polarizing film (A) to make $C_1$ and $C_2$ substantially equal to each other. The widthwise direction of the polarizing film (A) 3 means a direction orthogonal to the stretched direction (carried direction) of the polarizer 1 of the polarizing film (A).

The distances $C_1$ and $C_2$ are each preferably about 3% or less of the width $W_A$ of the polarizing film (A) 3, and are each more preferably from about 0.05 to 3%, even more preferably from about 0.1 to 2% thereof.

The difference ($W_A - W_B$) between the width $W_A$ of the polarizing film (A) 3 and the width $W_B$ of the surface-protective film (B) 6 is 3 mm or more, more preferably 5 mm or more, even more preferably 8 mm or more, furthermore preferably 10 mm or more. When the difference ($W_A - W_B$) is in any one of the ranges, the polarizing film can be restrained from being broken at the time of peeling off the surface-protective film even in a case where the polarizer is broken at an end of the polarizing film. The upper limit of the difference ($W_B - W_A$) is not particularly limited, and is preferably 100 mm or less, more preferably 50 mm or less in order to attain the surface protection (and, in particular, in order that when the polarizing film is a single-side-protected polarizing film, blocking thereof (adhesion between portions of the film when this film has been wound up) can be prevented).

The peel strength of the surface-protective film (B) 6 to the polarizing film (A) 3 is 0.2 N/25-mm or less, preferably 0.1 N/25-mm or less, more preferably 0.05 N/25-mm or less. When the peel strength is in any one of the ranges, the polarizing film (A) 3 can be restrained from being broken when the surface-protective film (B) 6 is peeled from the polarizing film (A) 3.

Hereinafter, a description will be made about each material used in the present invention.

(1) Polarizing Film (A)

The polarizing film (A) 3 used in the present invention includes a polarizer 1 and a protective film 2 on at least one surface of the polarizer 1.

The thickness of the polarizing film (A) is 100 μm or less, preferably 80 μm or less, more preferably 60 μm or less. When the thickness of the polarizing film (A) is in any one of the ranges, the surface-protective film-attached polarizing film can be made thinner and further the advantageous effects of the present invention can be favorably expressed.

The width of the polarizing film (A) 3 is not particularly limited, and may be appropriately determined in accordance with a use purpose of the surface-protective film-attached polarizing film. The thickness is, for example, preferably from about 1150 mm to 2000 mm, more preferably from about 1250 mm to 1600 mm.

(1-1) Polarizer

The polarizer used in the preset invention is a polarizer 1 with a thickness of 10 µm or less. The polarizer 1 preferably has a thickness of 8 µm or less, more preferably 7 µm or less, even more preferably 6 µm or less. On the other hand, the polarizer 1 preferably has a thickness of 2 µm or more, more preferably 3 µm or more. The polarizer 1 with such a small thickness is less uneven in thickness, has good visibility, and is less dimensionally-variable and thus has high durability to thermal shock.

A polarizer made from polyvinyl alcohol-based resin is used as a polarizer 1. For example, the polarizer 1 may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film, or may be a polyene-based oriented film such as a film of a dehydration product of polyvinyl alcohol or a dehydrochlorination product of polyvinyl chloride. Among these polarizers, a polarizer including a polyvinyl alcohol-based film and a dichroic material such as iodine is preferred.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of potassium iodide or the like optionally containing boric acid, zinc sulfate, zinc chloride, or other materials. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

In view of stretching stability and optical durability, the polarizer 1 preferably contains boric acid. In order to suppress the occurrence and the expansion of through cracks and nano-slits, the content of boric acid in the polarizer 1 is preferably 25% by weight or less, more preferably 20% by weight or less, even more preferably 18% by weight or less, further more preferably 16% by weight or less, based on the total weight of the polarizer. If the content of boric acid in the polarizer 1 is more than 20% by weight, shrinkage stress in the polarizer 1 can increase to make through cracks more likely to occur even when the thickness of the polarizer 1 is controlled to 10 µm or less, which is not preferred. On the other hand, in view of the stretching stability and optical durability of the polarizer 1, the content of boric acid is preferably 10% by weight or more, more preferably 12% by weight or more, based on the total weight of the polarizer.

Typical examples of the thin polarizer include the thin polarizers described in, for example, JP-B1-4751486, JP-B1-4751481, JP-B1-4815544, JP-B1-5048120, WO 2014/077599 A, and WO 2014/077636 A or thin polarizers obtained by the production methods described in these publications.

The polarizer 1 is preferably designed to have a single-body transmittance T and a polarization degree P that represent optical properties satisfying the condition of the following formula: $P > -(10^{0.929T} \cdot 42.4 - 1) \times 100$ (provided that T<42.3) or P≥99.9 (provided that T≥42.3). The polarizer designed to satisfy the condition uniquely has the performance required for a liquid crystal television display having a large display element. Specifically, such a display is required to have a contrast ratio of 1,000:1 or more and a maximum brightness of 500 $cd/m^2$ or more. In other applications, for example, the polarizer is bonded to the viewer side of an organic EL display device.

The thin polarizer described above should be produced by a process capable of achieving high-ratio stretching to improve polarizing performance, among processes including the steps of stretching and dyeing a laminate. From this point of view, the thin polarizer is preferably obtained by a process including the step of stretching in an aqueous boric acid solution as described in JP-B1-4751486, JP-B1-4751481, or JP-B1-4815544, and more preferably obtained by a process including the step of performing auxiliary in-air stretching before stretching in an aqueous boric acid solution as described in JP-B1-4751481 or JP-B1-4815544. These thin polarizers can be obtained by a process including the steps of stretching a laminate of a polyvinyl alcohol-based resin layer and a stretchable resin substrate and dyeing the laminate. Using this process, the polyvinyl alcohol-based resin layer, even when thin, can be stretched without problems such as breakage by stretching, because the layer is supported on the stretchable resin substrate.

(1-2) Protective Film

In the present invention, the polarizing film is a film in which the polarizer 1 has, on at least one surface thereof, the protective film 2. The polarizing film may be a single-surface-protected polarizing film in which the polarizer 1 has, on only one surface thereof, the protective film 2, or may be a double-side-protected polarizing film in which the polarizer 1 has, on both surfaces thereof, protective films 2, respectively. The single-surface-protected polarizing film is preferred for making the polarizing film thinner.

The protective film 2 is preferably made of a material having a high level of transparency, mechanical strength, thermal stability, water barrier properties, isotropy, and other properties. Examples of such a material include polyester-based polymers such as polyethylene terephthalate and polyethylene naphthalate, cellulose-based polymers such as diacetyl cellulose and triacetyl cellulose, acryl-based polymers such as polymethyl methacrylate, styrene-based polymers such as polystyrene and acrylonitrile-styrene copolymers (AS resins), and polycarbonate-based polymers. Examples of polymers that may be used to form the protective film also include polyolefin-based polymers such as polyethylene, polypropylene, cyclo-based or norbornene-structure-containing polyolefin, and ethylene-propylene copolymers, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinyl alcohol-based polymers, vinylidene chloride-based polymers, vinyl butyral-based polymers, arylate-based polymers, polyoxymethylene-based polymers, epoxy-based polymers, or any blends of the above polymers.

The protective film 2 may also contain any type of one or more appropriate additives. Examples of such additives include ultraviolet absorbers, antioxidants, lubricants, plasticizers, release agents, discoloration preventing agents, flame retardants, nucleating agents, antistatic agents, pigments, and colorants. The content of the thermoplastic resin in the protective film is preferably from 50 to 100% by mass, more preferably from 50 to 99% by mass, even more preferably from 60 to 98% by mass, further more preferably from 70 to 97% by mass. If the content of the thermoplastic resin in the protective film is less than 50% by mass, high transparency and other properties inherent in the thermoplastic resin may fail to be sufficiently exhibited.

The protective film 2 may also be, for example, a retardation film, a brightness enhancement film, or a diffusion film. The retardation film may have an in-plane retardation of 40 nm or more and/or a thickness direction retardation of 80 nm or more. The in-plane retardation is generally adjusted to fall within the range of 40 to 200 nm, and the thickness direction retardation is generally adjusted to fall within the range of 80 to 300 nm. When a retardation film is used as the protective film, the retardation film can also serve as a polarizer protecting film, which contributes to thickness reduction.

The retardation film may be a birefringent film formed by subjecting a thermoplastic resin film to uniaxial or biaxial stretching. The stretching temperature, the stretch ratio, and other conditions may be appropriately selected depending on the retardation value, the film material, and the thickness.

The thickness of the protective film 2 may be selected as appropriate. Generally in view of strength, workability such as handleability, thin layer formability, and other properties, the thickness of the protective film is preferably from 3 to 90 μm, more preferably from 3 to 80 μm. In particular, the thickness of the protective film (in the case where the film is formed in advance) is preferably from 15 to 80 μm, more preferably from 20 to 60 μm, in view of feedability. On the other hand, the thickness of the protective film (in the case where it is formed by coating and curing) is preferably from 3 to 25 μm, more preferably from 3 to 20 μm, in view of feedability. A plurality of pieces or layers of the protective film may also be used.

The surface of the protective film 2, opposite to its surface where the polarizer 1 is bonded, may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the protective film 2 itself or as a layer independent of the protective film.

(1-3) Intervening Layer

The protective film 2 and the polarizer 1 may be laminated with an intervening layer, such as an adhesive layer, a pressure-sensitive adhesive layer, or an undercoat layer (primer layer), between them. In this case, the intervening layer should preferably be used to laminate them with no air gap between them. Note that FIGURE does not show such an intervening layer between the polarizer 1 and the protective film 2.

The adhesive layer is made from an adhesive. Any of various types of adhesives may be used. The adhesive layer may be of any optically-transparent type. The adhesive may be any of various types, such as a water-based adhesive, a solvent-based adhesive, a hot melt-based adhesive, and an active energy ray-curable adhesive. A water-based adhesive or an active energy ray-curable adhesive is preferred.

The water-based adhesive may be, for example, an isocyanate-based adhesive, a polyvinyl alcohol-based adhesive, a gelatin-based adhesive, a vinyl-based adhesive, a latex-based adhesive, or a water-based polyester adhesive. The water-based adhesive is generally used in the form of an aqueous solution, which generally has a solids content of 0.5 to 60% by weight.

The active energy ray-curable adhesive is an adhesive capable of being cured by exposure to active energy rays such as electron beams or ultraviolet rays (a radically or cationically curable adhesive). The active energy ray-curable adhesive to be used may be of, for example, an electron beam-curable type or an ultraviolet-curable type. The active energy ray-curable adhesive may be, for example, a photo-radically curable adhesive. The photo-radically curable type active energy ray-curable adhesive may be of an ultraviolet-curable type. In this case, the adhesive should contain a radically polymerizable compound and a photopolymerization initiator.

The method for applying the adhesive is appropriately selected depending on the viscosity of the adhesive and the desired thickness. Examples of application means include a reverse coater, a gravure coater (direct, reverse, or offset), a bar reverse coater, a roll coater, a die coater, a bar coater, and a rod coater. Any other suitable application method such as dipping may also be used.

For example, when the water-based adhesive is used, the adhesive is preferably applied in such a manner that the finally formed adhesive layer can have a thickness of 30 to 300 nm. The adhesive layer more preferably has a thickness of 60 to 150 nm. On the other hand, when the active energy ray-curable adhesive is used, the adhesive layer is preferably formed with a thickness of 0.2 to 20 μm.

In the process of laminating the polarizer 1 and the protective film 2, an adhesion-facilitating layer may be placed between the protective film and the adhesive layer. The adhesion-facilitating layer may be made of, for example, any of various resins having a polyester skeleton, a polyether skeleton, a polycarbonate skeleton, a polyurethane skeleton, a silicone skeleton, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. Specifically, examples of the additives include a tackifier, an ultraviolet absorber, an antioxidant, or a stabilizer such as a heat-resistant stabilizer.

The adhesion-facilitating layer is usually provided in advance on the protective film, and then the adhesion-facilitating layer side of the protective film is bonded to the polarizer with the adhesive layer. The adhesion-facilitating layer can be formed using a known technique that includes applying an adhesion-facilitating-layer-forming material onto the protective film and drying the material. The adhesion-facilitating-layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 μm, more preferably 0.02 to 2 μm, even more preferably 0.05 to 1 μm. Two or more adhesion-facilitating layers may be provided. Also in this case, the total thickness of the adhesion-facilitating layers preferably falls within these ranges.

The pressure-sensitive adhesive layer is made from a pressure-sensitive adhesive. Any of various pressure-sensitive adhesives may be used, examples of which include rubber-based pressure-sensitive adhesives, acryl-based pressure-sensitive adhesives, silicone-based pressure-sensitive adhesives, polyurethane-based pressure-sensitive adhesives, vinyl alkyl ether-based pressure-sensitive adhesives, polyvinylpyrrolidone-based pressure-sensitive adhesives, polyacrylamide-based pressure-sensitive adhesives, and cellulose-based pressure-sensitive adhesives. The base polymer with adhesive properties is selected depending on the type of the pressure-sensitive adhesive. Among these pressure-sensitive adhesive adhesives, acryl-based pressure-sensitive adhesives are preferably used because they have a high level of optical transparency, weather resistance, heat resistance, and other properties, and exhibit an appropriate level of wettability and adhesive properties including cohesiveness and adhesiveness.

The undercoat layer (primer layer) is formed to improve the adhesion between the polarizer 1 and the protective film 2. The primer layer may be made of any material capable of providing somewhat strong adhesion to both the polarizer 1 and the protective film 2. For example, a thermoplastic resin having a high level of transparency, thermal stability, and stretchability may be used to form the primer layer. Such a thermoplastic resin may be, for example, an acryl-based resin, a polyolefin-based resin, a polyester-based resin, a polyvinyl alcohol-based resin, or any mixture thereof.

(2) Surface-Protective Film (B)

A surface-protective film-attached polarizing film 10 of the present invention is a film including a polarizing film (A) 3 and a surface-protective film (B) 6 on at least one surface of the polarizing film (A) 3.

When the polarizing film (A) 3 is a single-surface-protected polarizing film, the surface-protective film (B) 6 is, as illustrated in FIG. 1, bonded at least onto a polarizer-1-surface of the single-surface-protected polarizing film. This manner allows that when the single-surface-protected polarizing film is once wound up, blocking thereof that is caused by the polarizer (adhesion between portions of the wound film) is prevented. When the polarizing film (A) 3 is a double-side-protected polarizing film, the surface-protective film (B) 6 is bonded onto at least one of the protective films 2.

The surface-protective film (B) 6 usually has a substrate film 4 and a pressure-sensitive adhesive layer 5 to protect the polarizing film (A) 3 by aid of the pressure-sensitive adhesive layer 5.

In view of the ability to be tested or managed, an isotropic or nearly-isotropic film material should be selected as the substrate film 4 for the surface protective film (B) 6. Examples of such a film material include polyester-based resins such as polyethylene terephthalate films, cellulose-based resins, acetate-based resins, polyethersulfone-based resins, polycarbonate-based resins, polyamide-based resins, polyimide-based resins, polyolefin-based resins, acryl-based resins, and other transparent polymers. Thereamong, polyolefin-based resins are preferred. The substrate film 4 may be made of a single film material or a laminate of two or more film materials. The substrate film 4 may also be a product obtained by stretching the film.

Examples of the polyolefin-based resin include a homopolymer of an olefin monomer and a copolymer of olefin monomers. Specific examples of the polyolefin-based resin include; polyethylene-based resin such as high density polyethylene(HDPE), medium density polyethylene, low density polyethylene(LDPE), linear low density polyethylene(LLDPE); polypropylene; propylene-based copolymers such as block, random, and graft copolymers each including an ethylene component as a copolymer component; reactor TPO; and ethylene-based copolymers such as an ethylene-vinyl acetate copolymer, an ethylene-methyl acrylate copolymer, an ethylene-ethyl acrylate copolymer, an ethylene-butyl acrylate copolymer, an ethylene-methacrylic acid copolymer, and an ethylene-methyl methacrylate copolymer. Among these, polyethylene-based resin is preferred.

The thickness of the substrate film 4 is typically, but not limited to, about 200 μm or less, preferably 10 to 150 μm.

A pressure-sensitive adhesive that forms the pressure-sensitive adhesive layer 5 of the surface protective film (B) 6 is not particularly limited, and is preferably a pressure-sensitive adhesive used in the present field.

The thickness (dried film thickness) of the pressure-sensitive adhesive layer is designed to set the peel strength to the polarizing film (A) 3 into any one of the above-mentioned ranges, and is preferably from about 1 to 100 μm, more preferably from 5 to 50 μm.

About the surface protective film (B) 6, a low adhesive material for, for example, silicone treatment, alkyl long-chain treatment or fluorine treatment may be used to lay a release treatment layer onto a surface of the substrate film 4 that is opposite to the surface thereof on which the pressure-sensitive adhesive layer 5 is laid.

As the surface protective film (B), commercially available one is also favorably usable. An example thereof is a product TRETEC 7832C #30 manufactured by Toray Advanced Film Co., Ltd.

The width $W_B$ of the surface protective film (B) 6 may be appropriately determined in accordance with the width $W_A$ of the polarizing film (A) 3. The width is, for example, preferably from about 1100 to 2000 mm, more preferably from about 1147 to 1997 mm, even more preferably from about 1197 to 1597 mm.

The ratio ($W_A/W_B$) of the width $W_A$ of the polarizing film (A) 3 to the width $W_B$ of the surface protective film (B) 6 is not particularly limited, and is preferably more than about 1, and about 1.2 or less, more preferably more than about 1, and about 1.1 or less, even more preferably more than about 1, and about 1.05 or less.

2. Method for Producing Polarizing Film

The method of the present invention for producing a polarizing film includes a step (1) of bonding a surface-protective film (B) to at least one surface of a polarizing film (A) having a thickness of 100 μm or less to produce a surface-protective film-attached polarizing film as described above, and a step (2) of peeling off the surface-protective film (B) from the surface-protective film-attached polarizing film.

The polarizing film (A) 6, the thickness of which is 100 μm or less, the surface-protective film (B), and the surface-protective film-attached polarizing film 10 are as described above.

When the surface protective film (B) is bonded to the polarizing film (A), the bonding can be attained to bring a pressure-sensitive adhesive layer 5 surface of the surface protective film (B) into contact with a polarizer surface of the polarizing film (A) (in the case of a single-side-protected polarizing film), or a protective film surface of the polarizing film (A) (in the case of a double-side-protected polarizing film).

The surface-protective film-attached polarizing film 10 is a film for protecting the polarizing film (A) 3 until the polarizing film (A) 3 is practically used, and is peeled off when the polarizing film (A) 3 is practically used.

In the surface-protective film-attached polarizing film 10 of the present invention, the surface protective film (B) 6 has a specified size and peel strength. Thus, this film 10 can restrain the polarizing film (A) 3 form being broken when the surface protective film (B) 6 is peeled off from the polarizing film (A) 3. In particular, when the single-side-protected polarizing film is once wound into a roll form, it is necessary to bond the surface protective film (B) onto the polarizer surface of the single-side-protected polarizing film to prevent blocking caused by the polarizer. Thus, the following risk is increased: when the wound surface-protective film-attached polarizing film is unwound to peel off the surface protective film from the polarizer surface of the single-side-protected polarizing film, the single-side-protected polarizing film is broken. In such a case, the surface-protective film-attached polarizing film of the present invention allows to decrease the risk that the breaking is caused.

Conditions for the peeling are not particularly limited, and may be conditions used usually in the present field.

Before the step (1), the present method may include a step (3) of subjecting both ends of the polarizing film to slit working. The slit working may be performed in a manner performed usually in the present field. The slit working is preferably performed in parallel with the stretched direction (carried direction) of the polarizer.

Usually, when both ends of a polarizing film are subjected to slit working, the above-mentioned problem that the polarizing film (in particular which is a single-side-protected polarizing film) is broken is remarkably caused. However, even when the surface-protective film-attached polarizing film of the present invention is subjected to slit working, this film can restrain its polarizing film from being broken.

3. Use Method

The polarizing film yielded by peeling the surface protective film (B) 6 from the surface-protective film-attached polarizing film 10 of the present invention is usable in the state of being integrated into, for example, an image display. Moreover, it is allowable to bond the polarizing film to an optical member and further integrate the resultant, as an optical laminate, into an image display.

The bonding thereof to the optical film can be attained through a pressure-sensitive adhesive layer.

The pressure-sensitive adhesive layer may be formed using any appropriate type of pressure-sensitive adhesive. The type of the pressure-sensitive adhesive is not particularly limited. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive.

Among these pressure-sensitive adhesives, those having a high level of optical transparency and weather resistance or heat resistance and exhibiting an appropriate level of wettability and adhesive properties such as cohesiveness and adhesiveness are preferably used. An acryl-based pressure-sensitive adhesive is preferably used because it has such properties.

The pressure-sensitive adhesive layer can be formed by a method including applying the pressure-sensitive adhesive to a release-treated separator or other means, removing the polymerization solvent and other components from the adhesive by drying to form a pressure-sensitive adhesive layer, and then transferring the pressure-sensitive adhesive layer onto the polarizing film (A) 3. Alternatively, the pressure-sensitive adhesive layer can be formed by a method including applying the pressure-sensitive adhesive to the polarizing film (A) 3 and removing the polymerization solvent and other components from the adhesive by drying to form a pressure-sensitive adhesive layer on the polarizing film (A) 3. In the process of applying the pressure-sensitive adhesive, if necessary, one or more solvents other than the polymerization solvent may be newly added to the adhesive.

A silicone release liner is preferably used as the release-treated separator. In the invention, the pressure-sensitive adhesive may be applied to such a liner and then dried to form a pressure-sensitive adhesive layer. In this process, any appropriate method may be used for drying the pressure-sensitive adhesive, depending on purpose. Preferably, a method of heating and drying the coating film is used. The heating and drying temperature is preferably from 40° C. to 200° C., more preferably from 50° C. to 180° C., even more preferably from 70° C. to 170° C. When the heating temperature is set in the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, even more preferably from 10 seconds to 5 minutes.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or other means.

The thickness of the pressure-sensitive adhesive layer is typically, but not limited to, about 1 to about 100 μm, preferably 2 to 50 μm, more preferably 2 to 40 μm, even more preferably 5 to 35 μm.

When the pressure-sensitive adhesive layer is exposed, the pressure-sensitive adhesive layer may be protected by a release-treated sheet (separator) until it is actually used.

Examples of the material used to form such a separator include a plastic film such as a polyethylene, polypropylene, polyethylene terephthalate, or polyester film, a paper, a cloth, a porous material such as nonwoven fabric, and appropriate thin materials such as a net, a foamed sheet, a metal foil, and any laminate thereof. A plastic film is preferably used because of its good surface smoothness.

Such a plastic film may be of any type capable of protecting the pressure-sensitive adhesive layer. Such a plastic film may be, for example, a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, or an ethylene-vinyl acetate copolymer film.

The separator generally has a thickness of about 5 to about 200 μm, preferably about 5 to about 100 μm. If necessary, the separator may be subjected to a release treatment and an anti-pollution treatment with a silicone-based, fluoride-based, long-chain alkyl-based, or fatty acid amide-based release agent, a silica powder, or other materials, or subjected to an antistatic treatment of coating type, kneading and mixing type, vapor-deposition type, or other types. In particular, when the surface of the separator is appropriately subjected to a release treatment such as a silicone treatment, a long-chain alkyl treatment, or a fluorine treatment, the releasability from the pressure-sensitive adhesive layer can be further improved.

As a non-limiting example, such an optical member may be one or more optical members that have ever been used to form liquid crystal display devices or other devices, such as a reflector, a transflector, a retardation plate (including a wavelength plate such as a half or quarter wavelength plate), or a viewing angle compensation film. As an optical laminate, particularly preferred is a reflective or transflective polarizing film including a laminate of the polarizing film obtained by the production method of the invention and a reflector or a transflector, an elliptically or circularly polarizing film including a laminate of the polarizing film obtained by the production method of the invention and a retardation plate, a wide viewing angle polarizing film including a laminate of the polarizing film obtained by the production method of the invention and a viewing angle compensation film, or a polarizing film including a laminate of the polarizing film obtained by the production method of the invention and a brightness enhancement film.

The optical laminate including a laminate of the above optical member and the polarizing film of the invention may be formed by a method of stacking them one by one, for example, in the process of manufacturing a liquid crystal display device. However, the optical laminate should be formed by stacking them in advance, which is superior in quality stability or assembling workability and thus advantageous in facilitating the process of manufacturing liquid crystal display devices or other devices. When two or more optical members are laminated, any appropriate bonding means such as a pressure-sensitive adhesive layer may be used. In the bonding of the polarizing, their optical axes may be each aligned at an appropriate angle, depending on the desired retardation properties or other desired properties.

The polarizing film or the optical laminate obtained by the production method of the invention is preferably used to form various devices such as liquid crystal display devices or the like. Liquid crystal display devices may be formed according to conventional techniques. Specifically, a liquid crystal display device may be typically formed according to any conventional techniques by appropriately assembling a liquid crystal cell, polarizing films or optical films, and optional components such as a lighting system, incorporating a driving circuit, and performing other processes, except that the polarizing film or the optical laminate obtained by the production method of the invention is used. The liquid crystal cell to be used may also be of any type, such as IPS type or VA type. The invention is particularly suitable for IPS type.

Any desired liquid crystal display device may be formed, such as a liquid crystal display device including a liquid crystal cell and the polarizing film or films, or the optical laminate or laminates, obtained by the production method of the invention, placed on one or both sides of the liquid crystal cell, or a liquid crystal display device further including a backlight or a reflector in the lighting system. In such a case, the polarizing film or films or the optical laminate or laminates, obtained by the production method of the invention, may be placed on one or both sides of the liquid crystal cell. When the polarizing films or the optical laminates, obtained by the production method of the invention, are provided on both sides, they may be the same or different. The process of forming the liquid crystal display device may also include placing, at an appropriate position or positions, one or more layers of an appropriate component such as a diffusion plate, an antiglare layer, an anti-reflection film, a protective plate, a prism array, a lens array sheet, a light diffusion plate, or a backlight.

EXAMPLES

Hereinafter, the invention will be more specifically described with reference to examples. It will be understood that the examples shown below are not intended to limit the invention. In each example, "parts" and "%" are all by weight. Unless otherwise specified below, the conditions of standing at room temperature include 23° C. and 65% RH in all cases.

Production Example 1

Production of Polarizer

A corona treatment was performed on one surface of an amorphous isophthalic acid-copolymerized polyethylene terephthalate (IPA-copolymerized PET) film substrate (100 μm in thickness) with a water absorption of 0.75% and a glass transition temperature(Tg) of 75° C. An aqueous solution containing polyvinyl alcohol (4,200 in polymerization degree, 99.2% by mole in saponification degree) and acetoacetyl-modified PVA (Gohsefimer Z200 (trade name) manufactured by The Nippon Synthetic Chemical Industry Co., Ltd., 1,200 in polymerization degree, 4.6% in acetoacetyl modification degree, 99.0% by mole or more in saponification degree) in a ratio of 9:1 was applied to the corona-treated surface at 25° C. and then dried to form a 11-μm-thick PVA-based resin layer, so that a laminate was formed.

In an oven at 120° C., the resulting laminate was subjected to free-end uniaxial stretching to 2.0 times in the longitudinal direction between rolls at different peripheral speeds (auxiliary in-air stretching).

Subsequently, the laminate was immersed in an insolubilization bath (an aqueous boric acid solution obtained by adding 4 parts by weight of boric acid to 100 parts by weight of water) at a temperature of 30° C. for 30 seconds (insolubilization).

Subsequently, the laminate was immersed in a dyeing bath at a temperature of 30° C. while the iodine concentration and the immersion time were so controlled as to allow the resulting polarizing plate to have a predetermined transmittance. In this example, the laminate was immersed for 60 seconds in an aqueous iodine solution obtained by adding 0.2 parts by weight of iodine and 1.0 part by weight of potassium iodide to 100 parts by weight of water (dyeing).

Subsequently, the laminate was immersed for 30 seconds in a crosslinking bath (an aqueous boric acid solution obtained by adding 3 parts by weight of potassium iodide and 3 parts by weight of boric acid to 100 parts by weight of water) at a temperature of 30° C. (crosslinking).

The laminate was then uniaxially stretched to a total stretch ratio of 5.5 times in the longitudinal direction between rolls at different peripheral speeds while it was immersed in an aqueous boric acid solution (an aqueous solution obtained by adding 4 parts by weight of boric acid and 5 parts by weight of potassium iodide to 100 parts by weight of water) at a temperature of 70° C. (in-water stretching).

The laminate was then immersed in a cleaning bath (an aqueous solution obtained by adding 4 parts by weight of potassium iodide to 100 parts by weight of water) at a temperature of 30° C. (cleaning).

The resulting product was an optical film laminate including a 5-μm-thick and 1300-mm-width polarizer.

Production Example 2

Production of Single-Side-Protected Polarizing Film

The adhesion facilitation-treated surface of a lactone ring structure-containing (meth)acrylic resin film with a thickness of 40 μm was subjected to a corona treatment. The corona-treated film was used as a protective film.

An ultraviolet-curable adhesive was prepared by mixing 40 parts by weight of N-hydroxyethylacrylamide (HEAA), 60 parts by weight of acryloylmorpholine (ACMO), and 3 parts by weight of a photo-initiator (trade name: IRGA-CURE 819, manufactured by BASF). This was used as a adhesive for a protective film.

While the ultraviolet curable adhesive was applied onto the surface of the polarizer of the optical film laminate yielded in Production Example 1 to give an adhesive layer thickness of 1 μm after the adhesive would be cured, the above-mentioned protective film was bonded onto the applied adhesive layer. Thereafter, ultraviolet rays as active energy rays were radiated thereto to cure the adhesive. For the ultraviolet irradiation, the following was used: a gallium-sealed metal halide lamp (radiating instrument: Light HAMMER 10, manufactured by Fusion UV Systems, Inc.; bulb: V bulb; peak illuminance: 1600 mW/cm$^2$; integrated radiation quantity: 1000/mJ/cm$^2$ (at wavelengths of 380 to 440 nm)). The illuminance of ultraviolet rays was measured, using a Sola-Check system manufactured by Solatell Ltd.

Both ends of each of the resultant laminates (protective film/adhesive layer/polarizer/amorphous PET substrate) were subjected to slit working in parallel with the stretched direction (carried direction) with an edged tool.

Next, from the laminate subjected to the slit working, the amorphous PET substrate was peeled off. In this way, a single-side-protected polarizing film (total thickness: 46 μm) was produced, in which the thin polarizer was used. About optical properties of the resultant single-side-protected polarizing film, the single-body transmittance thereof was 42.8%, and the polarization degree was 99.99%.

<Single-Body Transmittance T and Polarization Degree P>

The single-body transmittance T and the polarization degree P of the obtained single-side-protected polarizing film was measured using an integrating sphere-equipped spectral transmittance meter (DOT-3C manufactured by Murakami Color Research Laboratory Co., Ltd.).

The polarization degree P is calculated from the formula below using the transmittance (parallel transmittance Tp) of a laminate of the same two polarizing films with their transmission axes parallel to each other and the transmittance (crossed transmittance Tc) of a laminate of the same two polarizing films with their transmission axes orthogonal to each other.

Polarization degree $P(\%) = \{(Tp-Tc)/(Tp+Tc)\}^{1/2} \times 100$

Each transmittance was expressed as the Y value, which was obtained through luminosity correction using the two-degree field (illuminant C) according to JIS Z 8701 when the transmittance for completely polarized light obtained through a Glan-Taylor prism polarizer was normalized to 100%.

Production Example 3

Production of Surface Protective Film

Into a reactor equipped with a condenser tube, a nitrogen introducing tube, a thermostat, and a stirrer were charged a mixed solution of 57 parts of 2-ethylhexyl acrylate, 40 parts of vinyl acetate, and 3 parts of acrylic acid, 0.15 parts of 2,2'-azobisisobutyronitrile as a polymerization initiator, and 300 parts of toluene to polymerize the polymerizable components at 60° C. for 12 hours to yield a solution of a polymer. The weight-average molecular weight $M_w$ of the resultant polymer was 460000, and the dispersion (Mw/Mn) thereof was 11.5. A mixed solution in which 2.0 parts of an epoxy-based crosslinking agent (trade name: TETRAD C, manufactured by Mitsubishi Gas Chemical Company, Inc.) were added to 100 parts of solid in the polymer was applied onto a low density polyethylene substrate (thickness: 60 μm) having a surface subjected to corona treatment to give a pressure-sensitive adhesive layer thickness of 15 μm after this layer would be dried. The resultant was dried to produce a surface protective film.

Production Example 4

Production of Surface Protective Film

The following were each supplied to an inflation shaping machine having a dice temperature of 200° C. to be coextrusion-shaped: a substrate layer made of a low density polyethylene having a flow rate of 2.0 g/10-min. at 190° C., and a density of 0.924 g/cm$^3$, and a pressure-sensitive adhesive layer made of a polypropylene/butene copolymer (having a ratio by mass of propylene/butene that was 85/15, and having an atactic structure) having a flow rate of 10.0 g/10-min. at 230° C., and a density of 0.86 g/cm$^3$. In this way, a surface protective film was yielded which was composed of the substrate layer of 30 μm thickness and a pressure-sensitive adhesive layer of 6 μm thickness, which was a pressure-sensitive-adhesive layer.

Example 1

A polyethylene film (trade name: PROTECT FILM TERETEC #30-7832C, manufactured by Toray Advanced Film Co., Ltd.) as a surface protective film was bonded to the polarizer surface (the polarizer surface on which no protective film was formed) of the single-side-protected polarizing film yielded in Production Example 2 to produce a surface-protective film-attached polarizing film. The width ($W_A$) of the used single-side-protected polarizing film was 1300 mm, and the width ($W_B$) of the surface protective film was 1290 mm. Both ends in the widthwise direction of the surface protective film were made inward by 5 mm, respectively, from both ends in the widthwise direction of the single-side-protected polarizing film.

Example 2

A surface-protective film-attached polarizing film was yielded in the same way as in Example 1 except that the width ($W_B$) of the surface protective film was changed to 1250 mm, and the both ends in the widthwise direction of the surface protective film were made inward by 25 mm, respectively, from the both ends in the widthwise direction of the single-side-protected polarizing film.

Example 3

A surface-protective film-attached polarizing film was yielded in the same way as in Example 2 except that as the surface protective film, the surface protective film yielded in Production Example 3 was used.

Comparative Example 1

A surface-protective film-attached polarizing film was yielded in the same way as in Example 1 except that the width ($W_B$) of the surface protective film was changed to 1330 mm, and the both ends in the widthwise direction of the surface protective film were made outward by 15 mm, respectively, from the both ends in the widthwise direction of the single-side-protected polarizing film.

Comparative Example 2

A surface-protective film-attached polarizing film was yielded in the same way as in Example 1 except that as the surface protective film, the surface protective film yielded in Production Example 3 was used, and the width ($W_B$) of the surface protective film was changed to 1300 mm (in other words, the both ends in the widthwise direction of the surface protective film were made consistent those of the single-side-protected polarizing film).

Comparative Example 3

A surface-protective film-attached polarizing film was yielded in the same way as in Example 1 except that as the surface protective film, the surface protective film yielded in Production Example 4 was used, the width ($W_B$) of the surface protective film was changed to 1330 mm, and the both ends in the widthwise direction of the surface protective film were made outward by 15 mm, respectively, from the both ends in the widthwise direction of the single-side-protected polarizing film.

Evaluations described below were made, using the surface-protective film-attached polarizing film yielded in each of the working examples and the comparative examples. Evaluation results are shown in Table 1.

<Peel Strength>

The surface-protective film-attached polarizing film yielded in each of the working examples and the comparative examples was cut out into a size of 25 mm width and 100 mm length. The resultant sample was allowed to stand still in an environment of 23° C. temperature and 50% RH for 30 minutes or longer. Thereafter, a universal testing machine was used to peel off the surface protective film at a peel rate of 0.3 m/minute (low-rate peeling) and a peeling angle of 180°. At this peeling time, the low-rate peel strength (N/25-mm) of the sample was measured. The measurement was made in the environment of 23° C. temperature and 50% RH.

<The Number of Times of Breaking>

When a sample of the surface-protective film-attached polarizing film was carried while its surface protective film was peeled off, the number of times of breaking was counted. The number of times of breaking denotes the following when this carrying test was performed 10 times: the number of times of the generation of breaking of the polarizing film that was followed by a failure of the carrying of the film.

DESCRIPTION OF REFERENCE SIGNS

1 Polarizer
2 Protective Film
3 Polarizing Film (A)
4 Substrate film
5 Pressure-sensitive adhesive layer
6 Surface-Protective Film (B)
10 Surface-Protective Film-Attached Polarizing Film
$W_A$ Width of polarizing film (A)
$W_B$ Width of surface protective film
$C_1$, $C_2$ Respective distances from both ends in widthwise direction of polarizing film (A) to corresponding both ends in widthwise direction of surface protective film (B)

The invention claimed is:

1. A surface-protective film attached to a polarizing film comprising:
   a polarizing film having a thickness of 100 µm or less, and
   a surface-protective film provided on at least one surface of the polarizing film,
   wherein the polarizing film comprises
      a polarizer, and
      a protective film on at least one surface of the polarizer,
   wherein the polarizer comprises a polyvinyl alcohol-based resin and has a thickness of 10 µm or less, and
   the surface-protective film comprises
      a substrate film, and
      a pressure-sensitive adhesive layer, the pressure-sensitive adhesive layer is provided on an entire surface of one side of the substrate film,
   wherein the polarizing film has a width $W_A$,
   wherein the surface-protective film has a width $W_B$,
   wherein a difference between the widths $W_A$ and $W_B$ ($W_A-W_B$) is 3 mm or more, and
   wherein a peel strength of the surface-protective film to the polarizing film is 0.2 N/25-mm or less.

2. The surface-protective film attached to a polarizing film according to claim 1,
   wherein the polarizing film is a single-side-protected polarizing film comprising the polarizer and the protective film on only one surface of the polarizer, and
   wherein the surface-protective film is provided at least on a polarizer surface of the single-side-protected polarizing film.

3. The surface-protective film attached to a polarizing film according to claim 1, wherein the width $W_B$ of the surface-protective film is from 1100 to 2000 mm.

4. A method for producing a polarizing film, comprising:
   a step (1) of bonding a surface-protective film to at least one surface of a polarizing film having a thickness of 100 µm or less to produce the surface-protective film attached to the polarizing film recited in claim 1, and

TABLE 1

| | Example 1 | Example 2 | Example 3 | Comparative Example 1 | Comparative Example 2 | Comparative Example 3 |
|---|---|---|---|---|---|---|
| Polarizing film width (mm) | 1300 | 1300 | 1300 | 1300 | 1300 | 1300 |
| Surface protective film width (mm) | 1290 | 1250 | 1250 | 1330 | 1300 | 1330 |
| Peel strength (N/25-mm) | 0.02 | 0.02 | 0.18 | 0.02 | 0.18 | 0.74 |
| Times of breaking (number of times) | 0 | 0 | 0 | 3 | 5 | 10 | a step (2) of peeling off the surface-protective film attached to the polarizing film.

5. The method for producing a polarizing film according to claim 4, further comprising:

before the step (1), a step (3) of subjecting both ends of the polarizing film, the thickness of which is 100 μm or less, to slit working.

\* \* \* \* \*